2,839,863

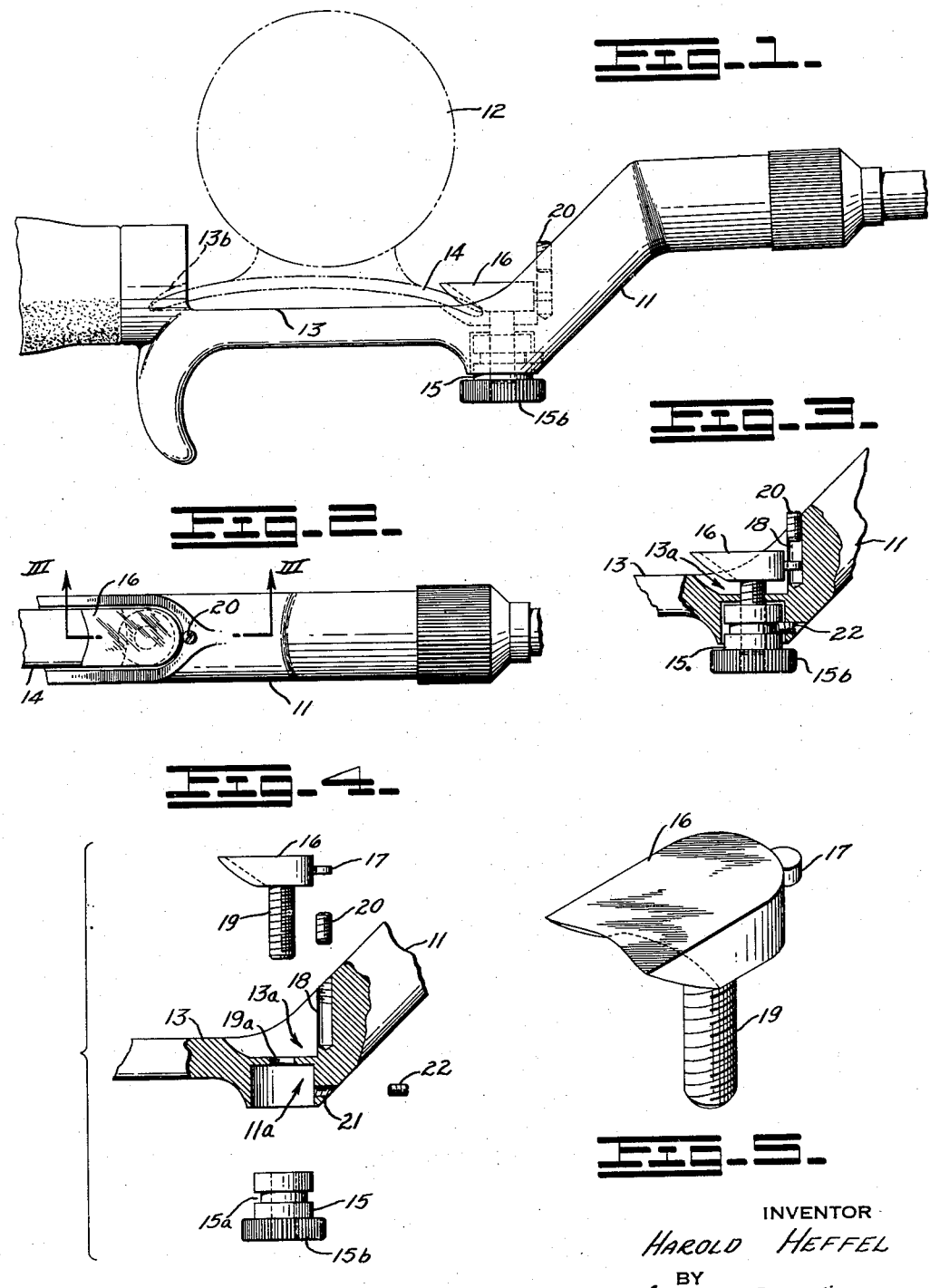

REEL CLAMP

Harold Heffel, Saginaw, Mich.

Application May 4, 1954, Serial No. 427,564

1 Claim. (Cl. 43—22)

The present invention relates to an improved novel and useful fishing reel clamp and more particularly to a screw type fishing reel clamp wherein the clamp parts are secured against loss and can be locked against movement while a fishing rod and its clamp attached reel are in use.

To fishermen who have been embarrassed by the loss of reel clamp parts, or who have had the misfortune of losing reels at some crucial point in a fishing expedition, the present invention is addressed. Where fishing trips have been ruined by the loss of reel seating components so that reel handles were rendered useless the present invention is welcomed as a clear advancement.

In simplicity of construction, while providing adequate and secure holding, the present invention materially reduces the cost of reel seating units or clamps.

It is one of the objects of this invention to provide a reel seating clamp wherein the possibility of a loss of component parts is materially reduced.

It is another object of the present invention to provide a reel seating clamp which is quickly manipulated to locking position and which may be positively secured against loosening under various vibrational and shock loads.

It is another object to provide a simple screw type reel clamp which admits of disassembly for cleaning.

Other objects including economy of production and adaptability to a wide variety of presently existing rod handle styles will become increasingly apparent to those skilled in the art as the description proceeds.

In the drawings:

Figure 1 is a side elevation view of a reel handle in which the inventive clamp has been installed.

Figure 2 is a partial top plan view of the reel seat portion of the handle illustrating the positioning of the wedge and guideway.

Figure 3 is a section view taken on the line III—III of Figure 2.

Figure 4 is a section view as in Figure 3 but exploded to show the individual reel clamp components.

Figure 5 is a perspective view of the wedge showing its plan configuration with the guide extending therefrom.

General description

In general a rod handle is provided with a countersunk recess through a portion of the reel seat. A stub nut having a knurled extension is inserted in the countersink. The stub nut is provided along its shank portion with an annular groove. A set screw or pin is inserted into the groove portion through a part of the handle preventing the removal of the stub nut from the countersunk recess while the stub nut may be freely rotated. The stub nut is provided with an axial threaded hole passing through its length. A wedge is provided which has a configuration such as to grip the reel base member against the reel seat or base portion of the handle. The forward portion of the wedge is provided with a guide extension generally cylindrical in form. From the flat base of the wedge depends a threaded shank. The threaded shank is freely rotatable in an opening provided through the axial center of the countersunk portion and through the remainder of the handle. A shoulder is provided in the handle between the countersunk recess portion and the base. A guideway is provided in the portion of the handle adjacent one end of the reel seat and rises vertically therefrom. The guideway is vertically slotted so as to open into the reel seat portion of the handle. The wedge is inserted in the handle with the guide movable vertically in the guideway and the stem passes through an opening in the base. The guideway is threaded to accommodate the adjustable insertion of a guideway set screw. As the stem of the wedge engages the mating thread in the stub nut the nut may be rotated clockwise, manipulation being facilitated by the knurled extension, and the wedge is thereby drawn downward into clamping contact with the base or reel seat. When a reel is seated in the reel recess, by running the rear reel base extension thereunder, and the wedge is drawn down on the opposite extension of the reel base, the reel is firmly held in the reel seat. The set screw in the guideway may be run down into engagement with the guide on the wedge thereby positively locking the wedge from movement. The guide also assures that no lateral movement will occur in the wedge. In no case, whether the reel be in the reel seat or disassociated from the handle, can any of the clamping or locking portions of the handle be lost since the set screws limit movement in the stub nut and deter loss of the wedge by engagement with the guide. It will be noted, however, that set screws are favored over pins or upsets which might be employed since the parts may be disassembled for cleaning where set screws are employed and assembly is greatly facilitated thereby.

Detailed description

In Figure 1 the handle portion 11 of a conventional bait casting rod is shown although it will be understood that the fishing rod may be a fly rod or salt water casting rod. A conventional reel 12 is shown in position (phantom lines) on the base or reel seat portion 13, the reel 12 being illustrated as having the conventional reel mounting plate 14 which is insertable at one end under a recess 13b in the handle 11 and clamped at the other end.

A bore or countersunk recess 11a is provided partially through the handle 11 as best illustrated in Figure 4. The countersunk recess 11a is cylindrical and perpendicular to the plane of the base or reel seat 13. The countersunk recess 11a is located proximate to one end of the base 13 and centered on the well portion 13a of the base 13. The purpose of the well portion 13a, provided in one end of the base 13, will become apparent as the description proceeds. A stub nut 15 is provided which is insertable and rotatable in the cylindrical countersink 11a. An annular groove 15a is provided in the shank portion of the stub nut 15. The groove 15a is so positioned that upon insertion of the stub nut 15 in the countersunk recess 11a the groove 15a is located substantially midway of the countersunk recess 11a. A knurled extension 15b is provided on one end of the stub nut 15 of a diameter in excess of the countersink 11a. The stub nut 15 is provided with a threaded through-hole running axially therethrough. The threaded portion of the stub nut 15 threadably engages the threaded stem 19 of the wedge 16. A stem clearance hole 19a is provided through the base 13 of the handle 11 of lesser diameter than the countersunk recess 11a.

The wedge 16 is generally rectangular in plan view as seen in Figure 5 being semicircular at one end and having a concave face at the other end. As best seen in Figure 4, the general configuration of the wedge member 16 is wedge-like, although the tapered under portion of the wedge 16 is generally curved to seat securely against a variety of reel plates 14. A wedge guide 17 extends outward from the rounded end of the wedge 16. The wedge guide 17 is generally disc-like in configuration and connected to the wedge 16 by a neck-like connection.

A vertical guideway 18 is provided through the handle 11 immediately adjacent to one end of the reel seat area. The guideway 18 is a cylindrical opening axially paralleling the axis of the stem 19 when engaged with the stub nut 15. The guideway 18 is slotted into the reel seat area so that the wedge guide 17 may be inserted therein and the wedge 16 may be moved vertically while being aligned by the guide 17 in the guideway 18 and the stem 19. The guideway 18 is threaded a substantial amount of its length and a guideway stop consisting of a set screw 20 is provided for insertion therein as best shown in Figure 3. While the slot and guideway 18 could be upset or plugged the set screw 20 is the preferred embodiment for reasons which will become increasingly apparent as the description proceeds.

A retainer hole 21 is provided through the handle 11 and runs into the countersunk recess 11a midway of the depth of the countersunk recess 11a so as to coincide in positioning with the annular groove 15a in the stub nut 15 when the stub nut 15 is inserted in the countersunk recess 11a. If the stub nut 15 is sought to be permanently fixed against removal, a pin is brazed into place or otherwise force fitted in the retainer hole 21 extending into the annular groove 15a. The preferred retainer, however, is the one illustrated in Figures 3 and 4, i. e., a stub nut set screw 22. In installations using a set screw 22 the retainer hole 21 is threaded as indicated.

Operation

A conventional rod handle 11 is provided with a countersunk 11a and a well portion 13a at one end of the reel seat portion or base 13. A slotted guideway 18 is provided in the shoulder portion of the handle 11 adjacent the reel seat portion 13 of the handle 11. Retainer means are adjustably inserted in the guideway 18. A retainer hole 21 is provided which coincides with the positioning of the annular groove 15a in the stub nut 15. Retaining means are insertable in the retainer hole 21 such as the set screw 22. Screw means are preferred inasmuch as assembly and disassembly is greatly facilitated thereby.

The stem 19 of the wedge 16 is inserted through the base 13 and into threaded engagement with the stub nut 15. The wedge 16 is of such configuration as to nest into the well portion 13a provided in the handle 11 when the wedge 16 is drawn downward by clockwise rotation of the stub nut 15. The guide 17 on the stub nut 15 slides vertically in the guideway 18 and is prevented thereby from shifting laterally as it is drawn down into locking position.

In assembly, the guide 17 of the wedge 16 is merely inserted slidably in the guideway 18 in register with the end of the reel seat portion 13 and drops into the well portion 13a, its stem entering the countersunk 11a. The stub nut 15 is drawn up on the stem 19 and the set screw 22 is run into the annular groove 15a. Similarly the set screw 20 is run into the guideway 18 preventing removal or loss of the wedge 16. When it is desired to loosen the clamp for placing a reel 12 on the seat 13, the stub nut 15 is rotated counterclockwise and the wedge 16 moves upward off of the base 13. The reel plate 14 is inserted in the recess 13b and the other end thereof is extended over the well portion 13a. The wedge 16 is drawn downward locking the reel 12 in position. The set screw 20 may then be run down against the guide 17 and the reel cannot come free of the handle 11. The wedge 16 is thus securely anchored against axial or lateral movement while in engagement with the reel plate 14.

It will be seen that no part of the reel locking clamp can fall free of the handle 11 unless by design of the user. If set screws are employed for retainer means the clamp may be simply disassembled for cleaning.

By reason of the guide means 17 provided in association with the wedge 16, and the guideway 18 located in the handle 11, accurate and unshifting relationship is maintained between the wedge 16 and the base or reel seat 13.

Having thus described a particular embodiment of my invention it will be understood that certain obvious modifications are intended to be included in the invention, limited only by the scope of the hereinafted appended claim.

I claim:

In a fishing reel clamp for rod handles, the combination including: a handle provided with a reel seat having a well portion at the forward end thereof; a substantially cylindrical vertically slotted guideway perpendicular to the reel seat provided in the wall of said well portion; a connecting bore defined by and extending through said handle and in said reel seat within said well portion; a countersunk portion extending upwardly and partially through said handle in coaxial relationship to said bore; a transverse retainer bore defined by said handle and extending therethrough to intersect said countersunk portion; a wedge element seated in said well portion and having a guide insertable in said guideway; said wedge being provided with a depending threaded stem which is axially insertable through said connecting bore and into said countersunk portion; a stub nut provided with a threaded bore therethrough to engage said stem so as to controllably raise and lower said wedge as desired by rotating said stub nut, said stub nut being provided with an annular groove and seated in said countersunk portion; a set screw stop adjustably provided in upper limits of said guideway for containing said guide within said guideway; a set screw provided through said transverse retainer bore and engaging said annular groove of said stub nut so as to retain said stub nut in rotatable relationship within said countersunk portion.

References Cited in the file of this patent

UNITED STATES PATENTS

| | | |
|---|---|---|
| 1,395,800 | Cochran | Nov. 1, 1921 |
| 1,962,869 | Heddon | June 12, 1934 |
| 2,198,588 | Stephens | Apr. 23, 1940 |
| 2,236,603 | Nelson | Apr. 1, 1941 |
| 2,260,204 | Balz et al. | Oct. 21, 1941 |